UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

985,406. Specification of Letters Patent. Patented Feb. 28, 1911.

No Drawing. Application filed November 10, 1909. Serial No. 527,218.

*To all whom it may concern:*

Be it known that I, CARLETON ELLIS, a citizen of the United States, and now residing at Montclair, county of Essex, and State of New Jersey, have invented certain new and useful Improvements Relating to Finish-Removers, of which the following is a specification.

This invention relates to finish removers and relates especially to substantially non-inflammable finish removers comprising ammonia gas incorporated with the substantially non-aqueous finish solvents.

Wood alcohol is capable of absorbing a large amount of ammonia gas at low temperature, as when the gas is allowed to percolate through the chilled alcohol as much as 30 or 40 per cent. or so by weight of ammonia is absorbed. Ammonia gas is also absorbed in considerable proportion by grain or denatured alcohol or acetone. The ammonia fumes evolved when these mixtures are exposed to evaporation practically suppress the inflammability of the alcohol or similar vapor given off so as to render the solvents practically non-inflammable and by restraining the evaporation or evolution of vapors from such solvents by the use of waxy or other evaporation-retarding or film-forming remover thickeners the difficulty due to the evolution of irritating ammonia fumes can be practically eliminated. The absorbed ammonia in the absence of water does not stain or injuriously affect woods and has comparatively little influence on the finish loosening or solvent powers of the incorporated volatile solvents. Of course other solvents may be incorporated with the alcohols or ketones, such as have been mentioned, but where benzol or other penetrating finish solvent material is incorporated it is preferable to use only a comparatively small quantity so as to have correspondingly little effect on the solvent power of the loosening solvent for ammonia. For most purposes 15 to 30 per cent. of benzol or the like is sufficient and gives very good results in removers of this character, although of course other penetrating finish solvent such as toluol or the commercial coal tar product containing the same, and known as solvent naphtha, turpentine, wood turpentine, light gasolene or the like, may be used to replace in part or in whole the benzol incorporated and of course chlorinated solvents, such as carbon-tetrachlorid may be used with good effect, the ammonia correcting any acid tendency of the chlorinated solvents that may be developed through hydrolysis or other action. It is desirable to incorporate sufficient waxy or other effective evaporation-retarding material to largely or substantially suppress evaporation of the solvents under service conditions in inclosed rooms or the like, and the waxes, such as paraffin, or ceresin wax, and especially the somewhat more saponifiable waxes, such as Japan wax, bayberry tallow, or beeswax, may be used to a greater or less extent.

A suitable illustrative remover composition may be prepared by allowing dry ammonia gas to percolate through wood alcohol kept at a suitably low temperature so that from 12 to 20 per cent. of its weight of ammonia is absorbed. 12 gallons of this ammoniated wood alcohol containing 15 per cent. of ammonia may be mixed with 3 gallons of benzol with which a suitable proportion of wax has been incorporated, such as 2 pounds of ceresin and 3 pounds of beeswax. Another illustrative composition may comprise 12 gallons of denatured alcohol containing about 10 per cent. of absorbed ammonia gas and incorporating the same with 4 gallons of solvent naphtha, such as contains considerable toluol and in which 2 pounds of bayberry tallow and 2 pounds of ceresin have been dissolved. Another composition may comprise 15 gallons of methyl acetone containing 12 per cent. of absorbed ammonia with which are incorporated 3 gallons of toluol and 1 gallon of carbon-tetrachlorid in which 4 pounds of paraffin and 4 pounds of beeswax have been dissolved.

Having described this invention in connection with a number of illustrative ingredients, formulas, proportions and processes, to the details of which disclosure the invention is not of course to be limited, what is new is—

1. The substantially non-inflammable non-aqueous finish remover comprising approximately 12 gallons of wood alcohol containing about 15 per cent. by weight of absorbed ammonia gas, 3 gallons of benzol, 2 pounds of ceresin and 3 pounds of beeswax.

2. The substantially non-inflammable non-aqueous finish remover comprising approximately 12 gallons of wood alcohol containing 10 to 20 per cent. of absorbed ammonia gas, 3 gallons of benzol and 5 pounds of incorporated waxy evaporation-retarding material comprising ceresin.

3. The substantially non-inflammable finish remover comprising approximately 12 gallons of alcohol containing about 10 to 20 per cent. of absorbed ammonia gas, and several gallons of benzol containing incorporated waxy evaporation-retarding material.

4. The substantially non-inflammable non-aqueous finish remover comprising loosening finish solvent material including alcohol containing about 10 to 20 per cent. of absorbed ammonia gas and 15 to 30 per cent. of miscible penetrating solvent material containing incorporated waxy evaporation-retarding stiffening material.

5. The substantially non-inflammable finish remover containing a large proportion of loosening finish solvent material including alcohol containing a considerable proportion of absorbed ammonia gas and between about 15 and 30 per cent. of miscible penetrating finish solvent material including benzol and incorporated waxy evaporation-retarding material.

6. The substantially non-inflammable finish remover consisting in greater part of loosening finish solvent material including an alcohol containing a considerable proportion of absorbed ammonia gas to suppress inflammability and between 15 and 30 per cent. of coöperating penetrating solvent material containing dissolved waxy evaporation-retarding stiffening material.

7. The substantially non-aqueous finish remover consisting in large part of loosening finish solvent material including an alcohol containing a considerable proportion of absorbed ammonia gas and a relatively small proportion of miscible penetrating solvent material including benzol containing dissolved waxy evaporation-retarding stiffening material.

8. The finish remover consisting in large part of loosening finish solvent material containing a considerable proportion of absorbed ammonia gas to suppress inflammability and between about 15 and 30 per cent. of coöperating penetrating finish solvent material and incorporated waxy evaporation-retarding material.

9. The substantially non-aqueous finish remover comprising a large proportion of loosening finish solvent material containing a considerable proportion of absorbed ammonia gas to suppress inflammability combined with a relatively small proportion of penetrating solvent material and evaporation-retarding stiffening material including mineral wax.

10. The finish remover consisting in large part of loosening finish solvent material containing a considerable proportion of absorbed ammonia gas to suppress inflammability and between about 15 and 30 per cent. of coöperating miscible penetrating finish solvent material including benzol containing dissolved waxy evaporation-retarding stiffening material.

CARLETON ELLIS.

Witnesses:
JESSIE B. KAY,
ALBERT C. THAYER.